Sept. 23, 1952    J. H. GEISSE    2,611,564
CROSS WIND UNDERCARRIAGE
Filed June 5, 1951    2 SHEETS—SHEET 1
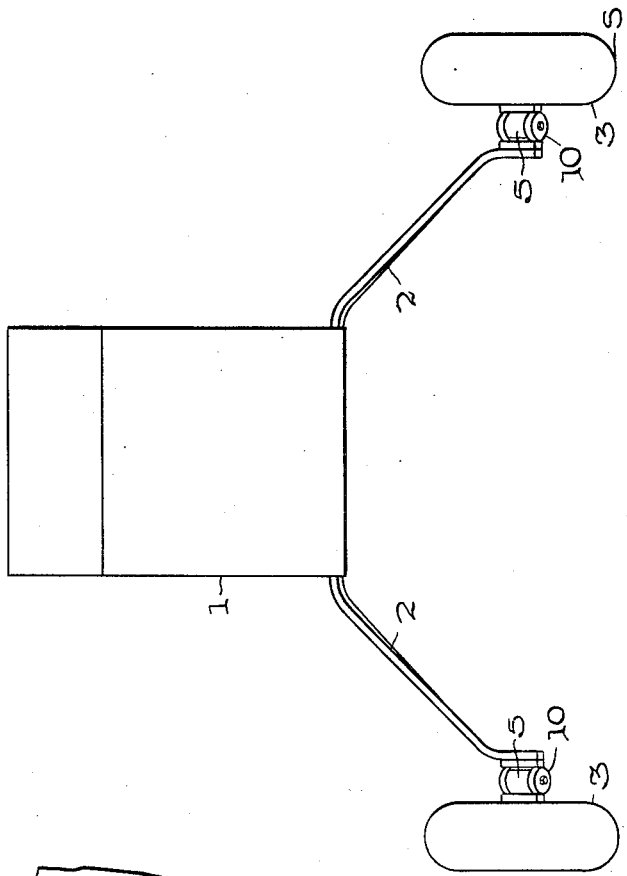
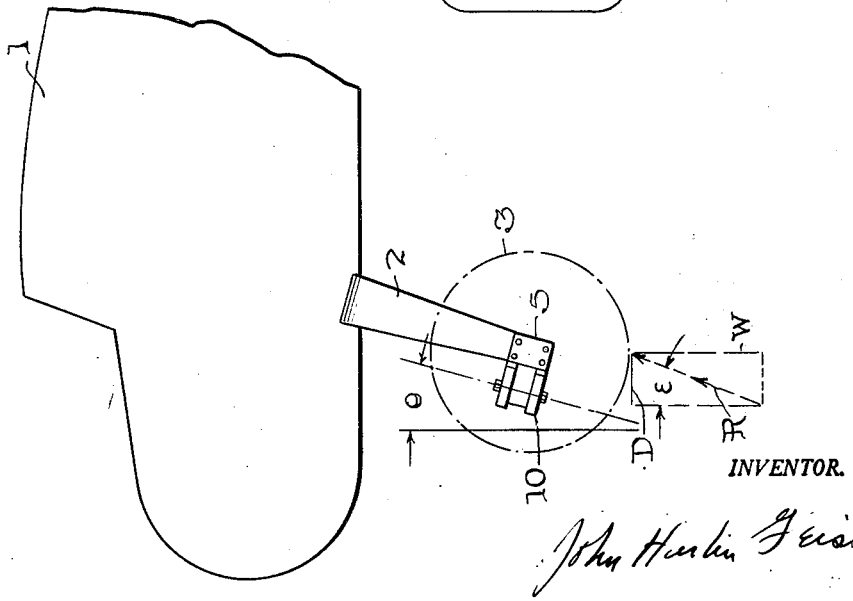
INVENTOR.
John Herbin Geisse Sept. 23, 1952 J. H. GEISSE 2,611,564
CROSS WIND UNDERCARRIAGE
Filed June 5, 1951 2 SHEETS—SHEET 2

INVENTOR.
John Harlin Geisse

Patented Sept. 23, 1952

2,611,564

UNITED STATES PATENT OFFICE 2,611,564

CROSS WIND UNDERCARRIAGE

John Harlin Geisse, Washington, D. C.

Application June 5, 1951, Serial No. 230,061

8 Claims. (Cl. 244—103)

My invention relates to cross wind undercarriages for airplanes conforming to the patent granted to me in response to my application Serial No. 146,708, filed February 28, 1950, now Patent No. 2,557,275, and has for its objective a further simplification of such undercarriages.

I accomplish my objective with a design of caster mechanism as illustrated in the accompanying drawings, of which:

Figure 1 is a side elevation of an airplane equipped with my invention and Figure 2 is a front elevation corresponding to Figure 1.

Figure 3:
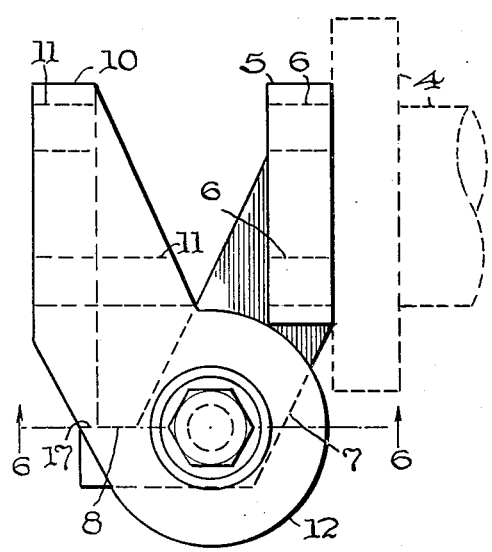
Figure 4:
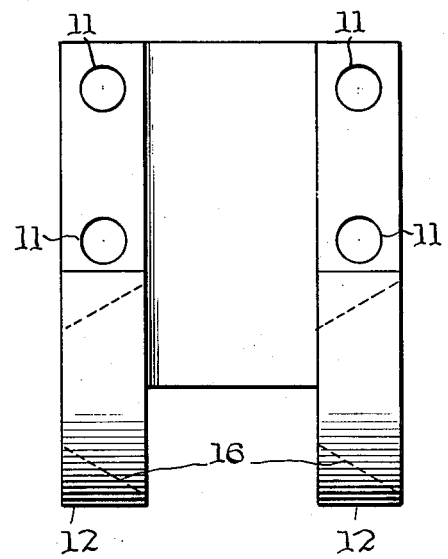
Figure 6:
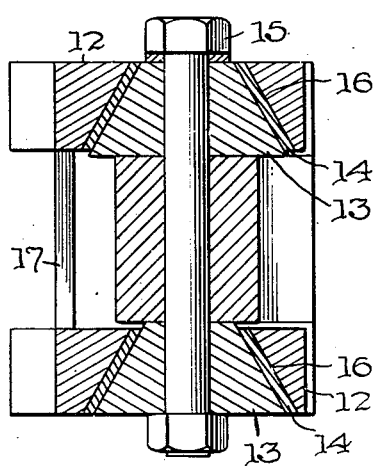
Figure 5:
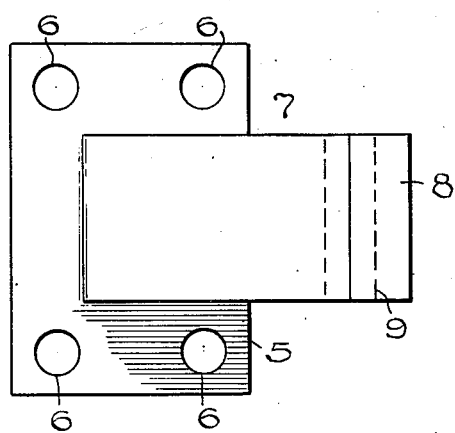

Figure 3 is a top view of the caster mechanism; Figure 4 is an end view of part 10; Figure 5 is a similar view of part 5; and Figure 6 is a section taken on the line 6—6 of Figure 3.

In Figure 1, 1 is the airplane fuselage which is ground supported by the spring struts 2 and the wheels 3. My mechanism is placed between the struts 2 and the wheels 3.

As shown in Figure 3, my mechanism consists of a part 5 for attachment to the wheel axle 4 (shown by dashed lines) by cap screws fitting into the tapped holes 6 and a part 10 for attachment to the strut 2 (not shown in Figure 3) by cap screws fitting into the tapped holes 11, and parts for their pivotable attachment described hereinafter.

As shown in Figure 5, part 5 has a forwardly extending part 7 having drilled hole 9. As shown in Figure 4 part 10 has two forwardly extending parts 12 adapted to straddle part 7 with some clearance. The forwardly extending parts 12 contain the tapered holes 16.

Figure 6 shows the method of pivotably connecting parts 5 and 10. Rigidly attached to part 5 by the bolt 15 passing through the hole 9 are the cone shaped parts 13 which are rotatably supported in the holes 16 in part 10. Interposed between the cones 13 and the tapered holes 16 are the bushings 14 made of some high friction coefficient material such as used for brake linings.

The cones 13 are pressed against the bushings 14 by the weight of the airplane when it is ground supported. When the airplane is not ground supported the cones 13 can recede from the bushings 14 by the amount of clearance between the part 7 of part 5 and the lower part 12 of part 10.

Rotation in one direction from the neutral position, which when installed on the airplane would permit the wheels to nose in, is prevented by the face 8 of the part 7 of part 5 contacting the face 17 on part 10.

Referring now to Figures 1 and 2 when the parts are installed on the airplane they are on the inboard side of the wheels and the caster axis, which would be the centerline of the bolt 15, is parallel with the plane of the wheel. This axis is also sloped in the fore and aft direction by the angle $\theta$ as shown in Figure 1. In this particular illustration the caster axis is also ahead of the center of the wheel 3 shown by the dashed line. This provides a caster effect for the wheel in addition to that which it would have by the slope of the caster axis although this may not be necessary.

In operation it will be apparent that the wheels can not toe in at any time due to the contact of the surfaces 8 and 17 previously mentioned. It will also be apparent that the force W, equal to the weight supported by the wheel, will tend to toe the wheels in since they are outboard of the caster axis.

It will also be apparent that a backwardly directed force D applied to the wheel at its contact with the ground will tend to turn the wheels out. However, the resultant of the two forces W and D, represented by the vector R, will provide a nose in moment until its angle with the vertical $e$ equals the angle of the caster axis to the vertical. If the angle $e$ exceeds $\theta$, as it would with hard application of the brake, the resultant R will provide a nose out moment on the wheel.

If now a side force S is applied to the wheel at its contact with the ground such as would be applied in a drift landing or in the execution of a rapid turn on the ground, it will be apparent that its magnitude will be controlled as to maximum value by the turning moment exerted by the resultant force R. In the absence of any appreciable force D the moment exerted by the resultant force R is substantially that exerted by the weight W and would be determined by the amount by which the caster axis is offset from the plane of the wheel and the sine of the angle $\theta$. And, since the moment arm of the side force S around the caster axis is determined by the radius of the wheel, the sine of the angle $\theta$, and the distance from the caster axis to the wheel centerline, it is apparent that its maximum value will be predetermined by the choice of these values in the original design.

From this maximum value, the side force S can be reduced to zero or made negative by increasing the force D by application of the brakes. It will be reversed in direction when the angle $e$ is made to exceed the angle $\theta$.

The advantage of reducing the maximum possible value of the inwardly directed side force S is clearly set forth in my patent, Patent No. 2,529,932 of November 14, 1950 and the advantage of reversing its direction is clearly set forth in my Patent No. 2,529,933 of the same date.

In operation, whenever the wheels are castered away from the stops preventing nose in, there will be a tendency for them to shimmy. In order to provide sufficient friction in the caster mechanism without increasing its size or adding to its complication I use the tapered cones 13, the tapered bushings 14 made from a high friction material, and the tapered holes 16. The entire weight of the airplane is carried on these tapered surfaces. However, experience has shown the entire weight of the airplane supported on equivalent bearings not tapered is insufficient to provide sufficient friction to damp out shimmy. By using the inclined surfaces I increase the pressure on the friction bushings 14 and hence increase their ability to dampen shimmy.

Having thus described my invention, I claim:

1. A cross wind undercarriage for airplanes including laterally spaced main ground engaging wheels, caster spindles and caster spindle bearings attaching said wheels to the airplane for casterable action thereon, said caster spindles lying in vertical planes adjacent to and inward from said wheels and inclined upward and backward in said planes, and stop means preventing said wheels from toeing in.

2. A cross wind undercarriage as described in claim 1 in which said caster spindles are placed forward of the axes of said wheels.

3. A cross wind undercarriage for airplanes including laterally spaced main ground engaging wheels, caster spindles and caster spindle bearings attaching said wheels to the airplane for casterable action thereon, said caster spindles being inclined upward and backward and so positioned that their axes extended would intersect the ground at points inward and ahead of the points of contact of said wheels with the ground, and stop means preventing said wheels from toeing in.

4. A cross wind undercarriage for airplanes as described in claim 3 in which said caster spindles are placed forward of the axes of said wheels.

5. A cross wind undercarriage for airplanes including laterally spaced main ground engaging wheels, axles for said wheels, spindles perpendicular to said axles and attached to the inner ends thereof, spindle bearings for attachment to suitable members of the airplane for pivotable support of said spindles around axes inclined upward and backward, and stop means preventing said spindles from rotating in said spindle bearings in directions which would cause said wheels to toe in toward each other.

6. A cross wind undercarriage for airplanes as defined in claim 5 together with cone shaped bearings concentric with the axes of said spindles for limiting the axial movement of said spindles in said spindle bearings.

7. A cross wind undercarriage for airplanes as defined in claim 5 in which said spindles are offset forwardly relative to said axles.

8. A cross wind undercarriage for airplanes as defined in claim 7 together with cone shaped bearings concentric with the axes of said spindles for limiting the axial movement of said spindles in said spindle bearings.

JOHN HARLIN GEISSE.

REFERENCES CITED

The following references are of record in the file of this patent:

UNITED STATES PATENTS

| Number | Name | Date |
|---|---|---|
| 2,394,825 | Trader | Feb. 12, 1946 |

FOREIGN PATENTS

| Number | Country | Date |
|---|---|---|
| 421,223 | Great Britain | Dec. 17, 1934 |